US012656886B2

(12) United States Patent
Sutardja et al.

(10) Patent No.: US 12,656,886 B2
(45) Date of Patent: Jun. 16, 2026

(54) FORCE-AUGMENTED SCROLLING INPUT DEVICE

(71) Applicant: Qorvo US, Inc., Greensboro, NC (US)

(72) Inventors: Victor Sutardja, Saratoga, CA (US);
Bryan Low, San Mateo, CA (US);
Julius Minglin Tsai, San Jose, CA (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 18/943,321

(22) Filed: Nov. 11, 2024

(65) Prior Publication Data

US 2025/0173006 A1 May 29, 2025

Related U.S. Application Data

(60) Provisional application No. 63/603,376, filed on Nov. 28, 2023.

(51) Int. Cl.
| | |
|---|---|
| *G06F 3/0354* | (2013.01) |
| *G06F 3/038* | (2013.01) |
| *G06F 3/042* | (2006.01) |
| *G06F 3/044* | (2006.01) |

(52) U.S. Cl.
CPC ........ *G06F 3/03543* (2013.01); *G06F 3/0383* (2013.01); *G06F 3/042* (2013.01); *G06F 3/044* (2013.01)

(58) Field of Classification Search
CPC .... G06F 3/03543; G06F 3/0383; G06F 3/042; G06F 3/044; G06F 3/03547; G06F 3/0362; G06F 3/0414; G06F 3/04164; G06F 3/0421; G06F 3/0447

See application file for complete search history.

(56) References Cited

U.S. PATENT DOCUMENTS

| | | | |
|---|---|---|---|
| 9,349,552 B2 | 5/2016 | Huska et al. | |
| 10,466,119 B2 | 11/2019 | Campbell et al. | |
| 10,866,683 B2 | 12/2020 | Gupta et al. | |
| 10,962,427 B2 | 3/2021 | Youssefi et al. | |
| 11,243,125 B2 | 2/2022 | Tsai et al. | |
| 11,243,126 B2 | 2/2022 | Bergemont et al. | |
| 11,255,737 B2 | 2/2022 | Foughi et al. | |
| 2002/0180710 A1 | 12/2002 | Roberts | |

(Continued)

*Primary Examiner* — Hong Zhou

(74) *Attorney, Agent, or Firm* — Withrow & Terranova, P.L.L.C.

(57) ABSTRACT

The present disclosure relates to a scrolling input device that maps a physical movement of a scroll gesture into a digital scrolling and includes a touch-surface with an active area, at least one force sensor, and a microcontroller. The force sensor is configured to detect force applied to the active area by sensing strains in the touch-surface during the physical displacement of the scroll gesture and to provide an output based on the sensed strains indicating information of an amount of the force applied to the active area. The microcontroller is configured to calculate the amount of the force applied to the active area based on the output of the force sensor and touch locations of the scroll gesture, to estimate a scrolling speed based on the calculated amount of the force, and to estimate the digital scrolling based on both the physical movement and the estimated scrolling speed.

19 Claims, 13 Drawing Sheets

(56)  References Cited

U.S. PATENT DOCUMENTS

| | | | | |
|---|---|---|---|---|
| 2003/0107547 A1* | 6/2003 | Kehlstadt | ............ | G06F 3/03543 |
| | | | | 345/156 |
| 2009/0251411 A1* | 10/2009 | Chen | ................... | G06F 3/03543 |
| | | | | 345/158 |
| 2014/0139471 A1* | 5/2014 | Matsuki | ................... | G06F 3/016 |
| | | | | 345/173 |
| 2014/0344763 A1* | 11/2014 | Yamamoto | ............ | G06F 3/0485 |
| | | | | 715/856 |
| 2021/0294479 A1* | 9/2021 | Moscovich | ............. | G06F 3/045 |
| 2022/0404938 A1* | 12/2022 | Rosenberg | ............ | G06F 3/0485 |

* cited by examiner

FORCE-AUGMENTED SCROLLING INPUT DEVICE

RELATED APPLICATIONS

This application claims the benefit of provisional patent application Ser. No. 63/603,376, filed Nov. 28, 2023, the disclosure of which is hereby incorporated herein by reference in its entirety.

FIELD OF THE DISCLOSURE

The present disclosure relates to a scrolling input device, and more particularly to a scrolling input device with one or more force sensors, which are capable of detecting force being applied during a physical displacement of a scroll gesture, thereby allowing the scrolling input device to modulate scrolling sensitivity based on the applied force.

BACKGROUND

Scrolling input devices (e.g., mouse input devices) typically map a physical movement (e.g., rotation of a wheel, or displacement of a finger) into a digital movement (e.g., pixels on a display, or lines of text in a file). This mapping is usually static: any given amount of physical movement will always produce an identical amount of digital movement, limiting the dynamic range of user inputs. A low sensitivity mapping that converts a large physical movement to a small digital movement gives the user very precise control, but requires multiple, repeated movements to scroll long distances. On the other hand, high sensitivity mapping generates large digital movements from small physical movements, which makes scrolling long distances easier at the cost of the ability to perform fine-grained adjustments. For example, if each unit of the physical movement scrolls a document by a single line, the user could easily use one scrolling input device to move a few lines but scrolling to the middle of a 100-line file would require a full-length gesture to be repeated 50 times. Modifying the input to scroll 25 lines for every unit of the physical movement would simplify this second task to just two repeated gestures but render it impossible to scroll by anything less than 25 lines at a time.

A conventional scrolling input device is usually operated with a single finger, with the scrolling gesture created by moving the finger forward and/or backward from some starting position. Because the physical distance traveled in a single scroll gesture is bounded by the active area of the scrolling input device and/or the finger's limited range of motion, the conventional scrolling input device is forced to make a trade-off between precise control and full-scale range. Typically, capacitive touching sensors are used in the scrolling input device to track the finger. The scrolling input device with the capacitive touching sensors requires one or more pairs of conductive planes, such that the capacitive touching sensors are capable of sensing the capacitance change due to the finger movement. These pairs of conductive planes may take up relatively large amounts of space and need more complex electrical connections. In addition, the capacitive touching sensors may be incapable of accurately sensing and/or interpreting a level of force applied.

Accordingly, there remains a need for improved scrolling input device designs, which are capable of both high sensitivity mapping and low sensitivity mapping. In addition, there is also a need to utilize sensors that can detect gesture pressure without conductive planes, so as to avoid a large device volume.

SUMMARY

The present disclosure relates to a scrolling input device that maps a physical movement of a scroll gesture into a digital scrolling. The disclosed scrolling input device includes a touch-surface with an active area where a force is applied, at least one force sensor formed under the active area of the touch-surface, and a microcontroller. Herein, the at least one force sensor is configured to detect the force applied to the active area by sensing strains in the touch-surface during the physical displacement of the scroll gesture and configured to provide an output based on the sensed strain indicating information of an amount of the force applied to the active area. The microcontroller is configured to calculate the amount of the force applied to the active area based on the output of the at least one force sensor and touch locations of the scroll gesture, configured to estimate a scrolling speed of the scrolling input device based on the calculated amount of the force applied to the active area, and configured to estimate the digital scrolling based on both the physical movement and the estimated scrolling speed.

In one embodiment of the scrolling input device, a relationship between the amount of the force applied to the active area and the scrolling speed of the scrolling input device is linear, power, or exponential.

In one embodiment of the scrolling input device, a relationship between the amount of the force applied to the active area and the scrolling speed of the scrolling input device monotonically increases or monotonically decreases.

According to one embodiment, the scrolling input device further includes a support structure and a main board. Herein, the support structure is connected to an underside of the touch-surface to provide a cavity within the scrolling input device. The support structure is configured to provide mechanical support to the main board, which is separate from the touch-surface and located in the cavity. The microcontroller is located on the main board and within the cavity and faces the underside of the touch-surface.

According to one embodiment, the scrolling input device further includes at least one suspended circuit board formed on the underside of the touch-surface. Herein, the at least one force sensor is connected to and suspended from the underside of the touch-surface via the at least one suspended circuit board, is confined in the active area, and is located within the cavity. The at least one suspended circuit board is configured to carry the output of the at least one force sensor.

In one embodiment of the scrolling input device, the at least one suspended circuit board is a printed circuit board (PCB) or a flexible printed circuit (FPC) board.

According to one embodiment, the scrolling input device further includes a capacitive touch film, which is formed underneath the underside of the touch-surface and covers the active area of the touch-surface. Herein, the capacitive touch film is configured to detect touch locations of the scroll gesture and configured to provide an output indicating the touch locations of the scroll gesture. The microcontroller is configured to estimate the physical displacement of the scroll gesture based on the output of the capacitive touch film.

In one embodiment of the scrolling input device, the capacitive touch film is formed directly underneath the underside of the touch-surface, and the at least one suspended circuit board is formed directly underneath the capacitive touch film.

In one embodiment of the scrolling input device, the at least one suspended circuit board is a portion of the capacitive touch film.

In one embodiment of the scrolling input device, the capacitive touch film is an FPC board or a PCB.

In one embodiment of the scrolling input device, the at least one force sensor includes a number of force sensors, and the at least one suspended circuit board includes a number of suspended circuit boards. Herein, the force sensors are spread out across and around the active area. Each of the force sensors is connected to and suspended from the underside of the touch-surface via a corresponding one of the suspended circuit boards. The force sensors are configured to detect both the force applied to the active area and touch locations of the scroll gesture and configured to provide a number of outputs, respectively, indicating information of both the touch locations of the scroll gesture and the amount of the force applied to the active area. The microcontroller is configured to further estimate the physical displacement of the scroll gesture based on the outputs of the force sensors.

According to one embodiment, the scrolling input device further includes at least one optical light guide with at least one optical sensor. Herein, one end of the at least one optical light guide extends through the touch-surface to allow light to pass through the touch-surface into the cavity, and another end of the at least one optical light guide is in contact with the main board to secure the light passing along the optical light guide. The at least one optical sensor is placed on the main board, faces the underside of the touch-surface, and is confined within the at least one optical light guide. The at least one optical sensor is configured to detect touch locations of the scroll gesture, and configured to provide an output indicating information of the touch locations of the scroll gesture. The microcontroller is configured to estimate the physical displacement of the scroll gesture based on the output of the at least one optical sensor.

According to one embodiment, the scrolling input device further includes at least one connecting structure. Herein, the at least one connecting structure extends from the underside of the touch-surface towards the main board, and is configured to transfer the force applied to the touch-surface to the main board. The at least one force sensor is attached to the main board, adjacent to the at least one connecting structure, faces the underside of the touch-surface, and resides within the cavity. The at least one force sensor is configured to detect the force applied to the active area by sensing strains in the main board that are caused by the strains in the touch-surface.

According to one embodiment, the scrolling input device further includes a capacitive touch film, which is formed underneath the underside of the touch-surface and covers the active area of the touch-surface. Herein, the capacitive touch film is configured to detect touch locations of the scroll gesture and configured to provide an output indicating information of the touch locations of the scroll gesture. The microcontroller is configured to estimate the physical displacement of the scroll gesture based on the output of the capacitive touch film.

In one embodiment of the scrolling input device, the at least one force sensor includes a number of force sensors, and the at least one connecting structure includes a number of connecting structures, which are spread out across and underneath the active area. Each of the connecting structures extends from the underside of the touch-surface towards the main board, and is configured to transfer the force applied to the touch-surface to the main board. Each of the force sensors is attached to the main board, adjacent to a corresponding one of the connecting structures, faces the underside of the touch-surface, and resides within the cavity. The force sensors are configured to detect both the force applied to the active area and touch locations of the scroll gesture and configured to provide a number of outputs, respectively, indicating information of both the touch locations of the scroll gesture and the amount of the force applied to the active area. The microcontroller is configured to further estimate the physical displacement of the scroll gesture based on the outputs of the plurality of force sensors.

According to one embodiment, the scrolling input device further includes at least one optical light guide with at least one optical sensor. Herein, one end of the at least one optical light guide extends through the touch-surface to allow light to pass through the touch-surface into the cavity, and another end of the at least one optical light guide is in contact with the main board to secure the light passing along the optical light guide. The at least one optical sensor is placed on the main board, faces the underside of the touch-surface, and is confined within the at least one optical light guide. The at least one optical sensor is configured to detect touch locations of the scroll gesture, and configured to provide an output indicating the touch locations of the scroll gesture. The microcontroller is configured to estimate the physical displacement of the scroll gesture based on the output of the at least one optical sensor.

In one embodiment of the scrolling input device, the at least one connecting structure is integrated with the touch-surface as a single piece and is connected to the main board via at least one rubber gasket.

According to one embodiment, the scrolling input device further includes at least one connecting base and at least one optical light guide with at least one optical sensor. Herein, the at least one connecting base is formed on the main board and faces the underside of the touch-surface. One end of the at least one optical light guide extends through the touch-surface to allow light to pass through the touch-surface into the cavity, and another end of the at least one optical light guide is in contact with the at least one connecting base. A combination of the at least one optical light guide and the at least one connecting base is configured to transfer the force applied to the touch-surface to the main board. The at least one optical sensor is placed on the main board, faces the underside of the touch-surface, and is confined within the at least one connecting base. The at least one optical sensor is configured to detect touch locations of the scroll gesture and configured to provide an output indicating information of the touch locations of the scroll gesture. The at least one force sensor is placed on the main board, faces the underside of the touch-surface, and is confined within the at least one connecting base. The at least one force sensor is configured to detect the force applied to the touch-surface by sensing strains in the main board that are caused by the strains in the touch-surface. The microcontroller is configured to estimate the physical displacement of the scroll gesture based on the output of the at least one optical sensor.

In one embodiment of the scrolling input device, the at least one connecting base is formed of rubber or plastic and has a ring shape.

According to one embodiment, the scrolling input device further includes a memory component, which is configured to store algorithms used for calculating the amount of the force applied to the active area based on the output of the at least one force sensor.

According to one embodiment, a method of operations of a scrolling input device for mapping a physical movement of a scroll gesture into a digital scrolling starts with sensing strains in a touch-surface by one or more force sensors of the scrolling input device during the physical displacement of the scroll gesture, so as to detect force applied to an active area of the touch-surface. The one or more force sensors then provide an output based on the sensed strains indicating information of an amount of the force applied to the active area. Next, the amount of the force applied to the active area is calculated by a microcontroller of the scrolling input device based on the output and touch locations of the scroll gesture. The microcontroller further estimates a scrolling speed of the scrolling input device based on the calculated amount of the force applied to the active area, and estimates the digital scrolling based on both the physical movement and the estimated scrolling speed.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

Figure 1:
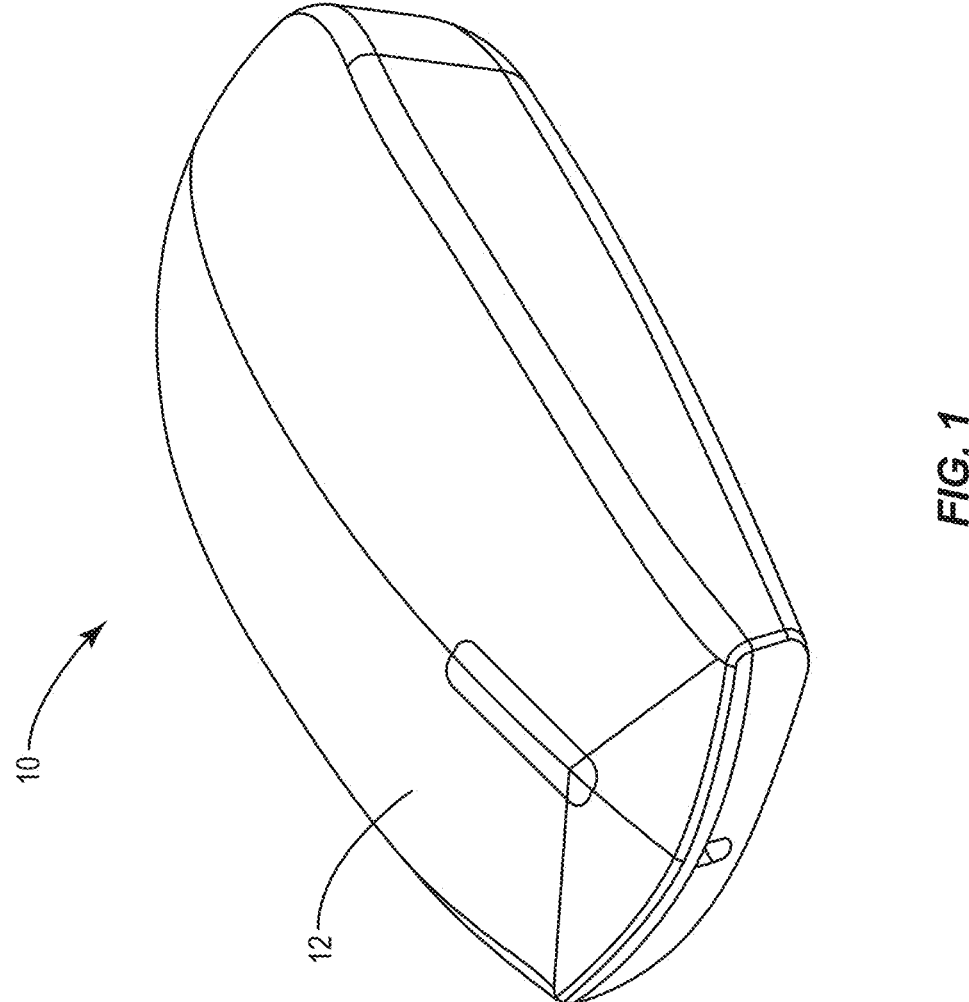
FIG. 1 illustrates an external appearance of an exemplary scrolling input device (e.g., a mouse), which is capable of utilizing one or more force sensors to detect force being applied during a physical displacement of a scroll gesture.

It will be understood that for clear illustrations, FIGS. 1-13 may not be drawn to scale.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

The present disclosure relates to a scrolling input device integrated with one or more force sensors, which are capable of detecting force being applied during a physical displacement of a scroll gesture. Accordingly, the disclosed scrolling input device is allowed to modulate scrolling sensitivity based on an amount of force applied to the scrolling input device, which provides users with both fine-grained control and a large full-scale range without requiring any configuration changes.

FIG. 1 shows a three-dimensional appearance of an exemplary scrolling input device 10 (e.g., a mouse) with a touch-surface 12, where a user's finger touches and provides force. The scrolling input device 10 is capable of utilizing one or more force sensors (not shown in FIG. 1) to detect force being applied to the touch-surface 12 during a scroll gesture, and optionally also configured to determine a physical displacement of the scroll gesture. Herein, the scroll gesture might be created by moving a finger forward and/or backward from a starting position. The scroll gesture (i.e., the finger movement) might be tracked directly.

Figure 2:
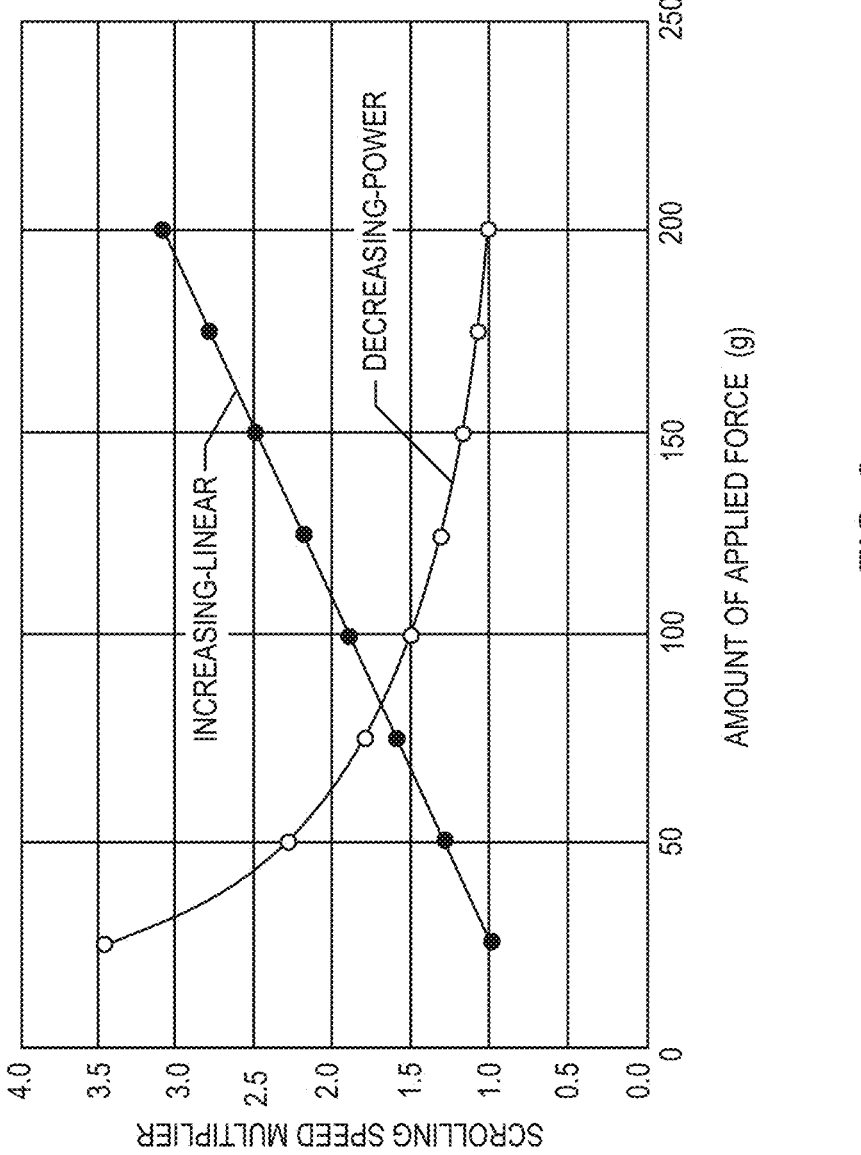
FIG. 2 shows an exemplary relationship between an amount of force applied to a scrolling input device and a scrolling sensitivity of the scrolling input device.

For the scrolling input device 10, a scrolling sensitivity can be modulated by changes in the amount of the force being applied during the scroll gesture. FIG. 2 shows an exemplary relationship between the amount of the force applied to the scrolling input device 10 and the scrolling sensitivity of the scrolling input device 10. Herein, the scrolling sensitivity of the scrolling input device 10 is represented by a scrolling speed multiplier. When the scrolling speed multiplier has a relatively low value, the scrolling speed of the scrolling input device 10 is relatively slow (i.e., for a given amount of physical movement, a relatively small amount of digital movement is produced), such that the scrolling sensitivity is relatively low. On the other hand, when the scrolling speed multiplier has a relatively high value, the scrolling speed of the scrolling input device 10 is relatively fast (i.e., for a given amount of physical movement, a relatively large amount of digital movement is produced), such that the scrolling sensitivity is relatively high. A relationship between the amount of the force applied to the scrolling input device 10 and the scrolling speed multiplier of the scrolling input device 10 may take on any arbitrary form: the scrolling speed multiplier (i.e., the scrolling sensitivity) of the scrolling input device 10 can be designed to either increase or decrease with the amount of the force applied to the scrolling input device 10. In addition, the relationship between the amount of the force applied to the scrolling input device 10 and the scrolling speed multiplier of the scrolling input device 10 can be linear, power, exponential, or any other shape, etc. Regardless, the scrolling speed multiplier (i.e., the scrolling sensitivity) of the scrolling input device 10 will always change depending on the amount of the force applied to the scrolling input device 10.

Figure 3A:
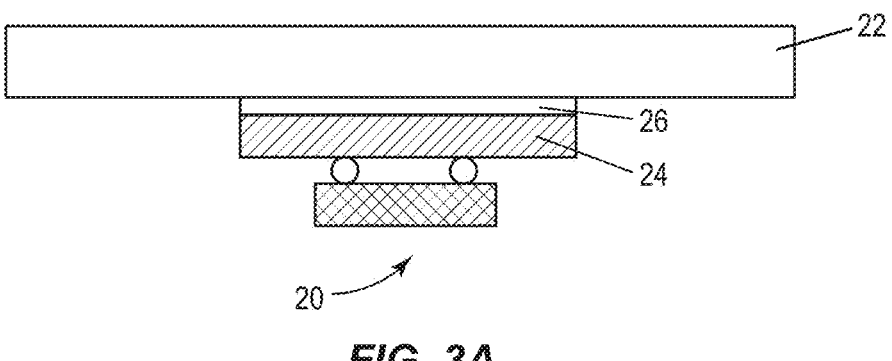
FIGS. 3A-3C illustrate an operation theory of a force sensor used in the scrolling input device according to some embodiments.
Figure 3B:
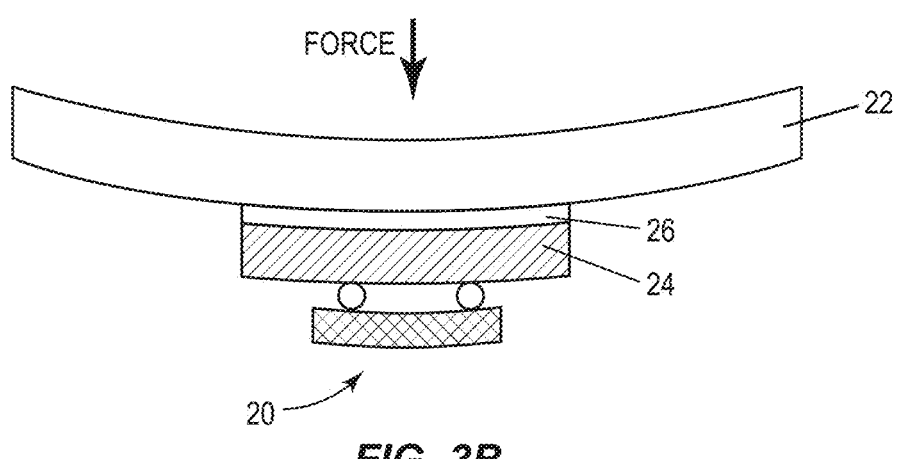
Figure 3C:
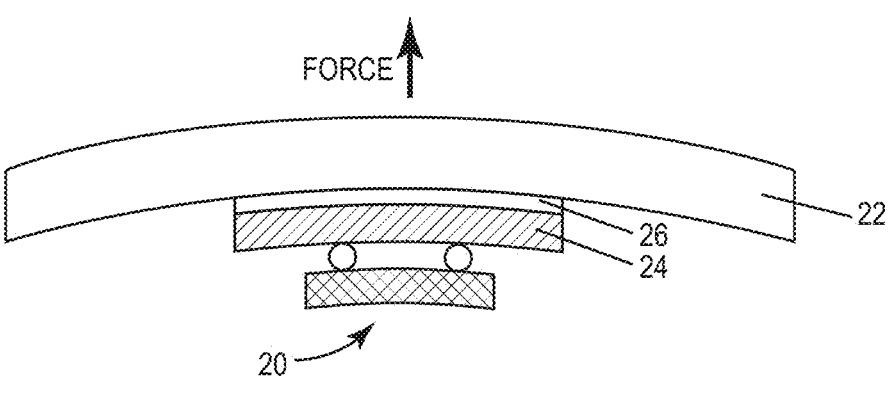

FIGS. 3A-3C illustrate an operation theory of a force sensor used in the scrolling input device 10 according to some embodiments. Typically, a force sensor 20 is connected to and suspended from an underside of a touch-surface 22 (e.g., the touch-surface 12 of the scrolling input device 10) via a suspended circuit board 24, which is secured to the underside of the touch-surface 22 with an adhesive 26. The force sensor 20 is configured to detect the force applied to the touch-surface 22 by sensing the strains in the touch-surface 22. When the strains in the touch-surface 22 change due to the amount of the force applied, the force sensor 20 is bending. As the degree of bending increases, a magnitude of change in output of the force sensor 20 also increases, which indicates an increased amount of the force applied. A polarity of the output of the force sensor 20 depends on whether the relative bending of the force sensor 20 is convex or concave. FIG. 3A shows the force sensor 20 attached to the touch-surface 22 without any force applied, FIG. 3B shows the force sensor 20 attached to the touch-surface 22 with an applied downward force (i.e., the force sensor 20 has a positive output), and FIG. 3C shows the force sensor 20 attached to the touch-surface 22 with an applied upward force (i.e., the force sensor 20 has a negative output).

Note that the amount of the force applied to the touch-surface 22 is not directly provided by the force sensor 20 but is calculated by normalizing the output of the force sensor 20 based on a calibration table that contains force sensing sensitivity as a function of a touch location of the amount of force applied. For a non-limiting example, where:

the touch location changes from x=1 mm to x=3 mm;

the output of the force sensor 20 changes from 5000 to 7500 analog-to-digital converter (ADC) counts; and the force sensing sensitivity of the force sensor 20 is 100 counts per gram at x=1 mm and 150 counts per gram at x=3 mm.

In this scenario, although the finger has moved 2 mm, the calculated amount of the force applied has remained at a constant 50 g. It is because the amount of the force applied to the touch-surface 22=the output of the force sensor 20/the force sensing sensitivity at a certain touch location. At x=1 mm, the calculated amount of the force applied=5000 counts/(100 counts/g)=50 g, while at x=3 mm, the calculated amount of the force applied=7500 counts/(150 counts/g)=50 g.

Note that, unlike a capacitive touching sensor, which requires a pair of conductive planes, the force sensor 20 does not need any conductive plane to measure the force applied to the connected touch-surface 22. Exemplary implementations of the force sensor 20 can be found in U.S. Pat. No. 11,255,737 B2, titled INTEGRATED DIGITAL FORCE SENSORS AND RELATED METHODS OF MANUFACTURE, which is incorporated herein by reference. The suspended circuit board 24 may be a printed circuit board (PCB) or a flexible printed circuit (FPC) board with a thickness of 0.1 mm or more (e.g., between 0.4 mm and 1.6 mm). The suspended circuit board 24 is configured to carry the electrical signals (e.g., the output of the force sensor 20) and power to/from the force sensor 20, and may help prevent excessive flexing, twisting or bending of the force sensor 20. The adhesive 26 may be a double-sided pressure sensitive adhesive (PSA) tape or epoxy.

Figure 4:
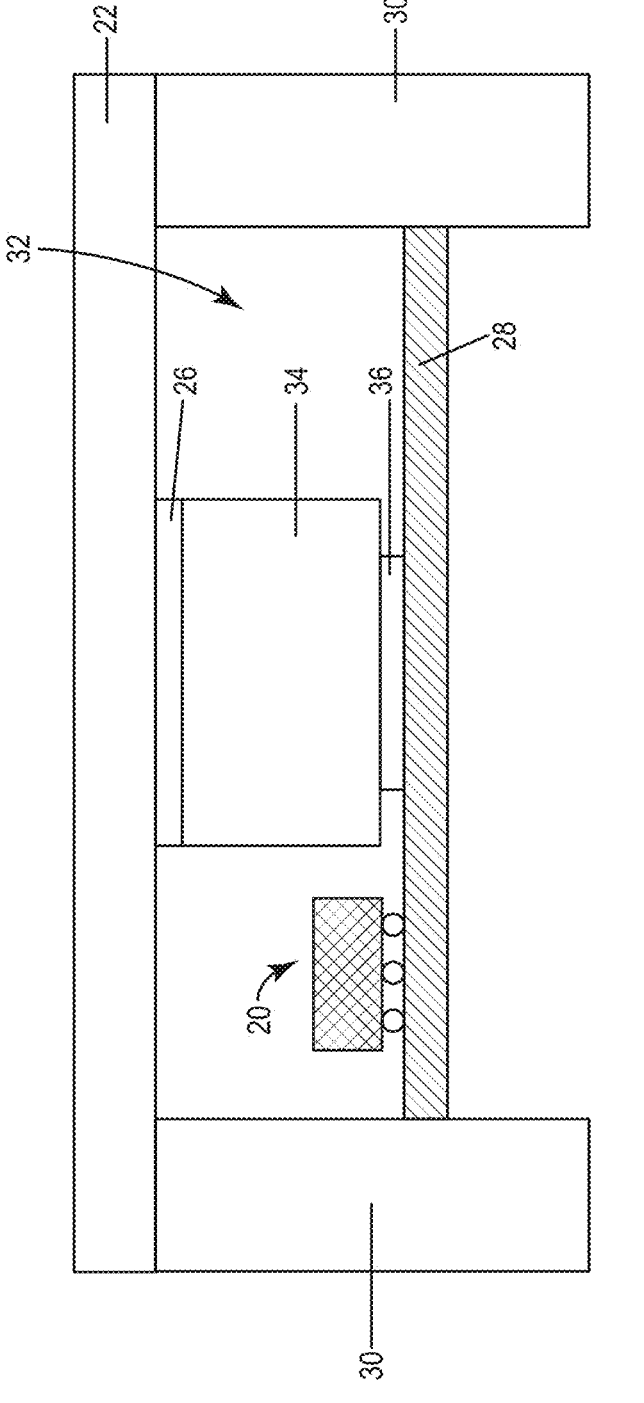
FIG. 4 illustrates an alternative connection configuration of the force sensor according to some embodiments.

In different applications, the force sensor 20 may sense the strains of the touch-surface 22 in a different configuration. As shown in FIG. 4, the force sensor 20 is not connected to or suspended from the underside of the touch-surface 22. Instead, the force sensor 20 may be attached to a floating circuit board 28 which is separate from the touch-surface 22. Herein, the floating circuit board 28 is held by a support structure 30 which extends from the underside of the touch-surface 22. As such, the touch-surface 22, the support structure 30, and the floating circuit board 28 form a cavity 32, and the force sensor 20 resides in the cavity 32 and on a top surface of the floating circuit board 28. In addition, a connecting structure 34 is provided between the touch-surface 22 (e.g., via the adhesive 26) and the floating circuit board 28 (e.g., via a rubber gasket 36), such that the force applied to the touch-surface 22 can be transferred to the floating circuit board 28 through the connecting structure 34. The force sensor 20 is configured to detect the force applied to the touch-surface 22 by sensing the strains in the floating circuit board 28 (i.e., the strains in the floating circuit board 28 are caused by the strains in the touch-surface 22). The connecting structure 34 may be formed of a same material as the touch-surface 22, and in some cases, may be integrated with the touch-surface 22 as a single piece (the adhesive 26 may be omitted).

FIGS. 5-11B illustrate exemplary implementations of the scrolling input device 10 with one or more force sensors according to some embodiments. For clarity and simplicity, FIGS. 5-11B only show partial internal illustrations of the scrolling input device 10. In addition, although the scrolling input device 10 is shown as a mouse input device, similar force sensor configurations may also apply to other scrolling input devices, such as a tracking pointer, a touchpad, or other touch-control devices.

Figure 5:
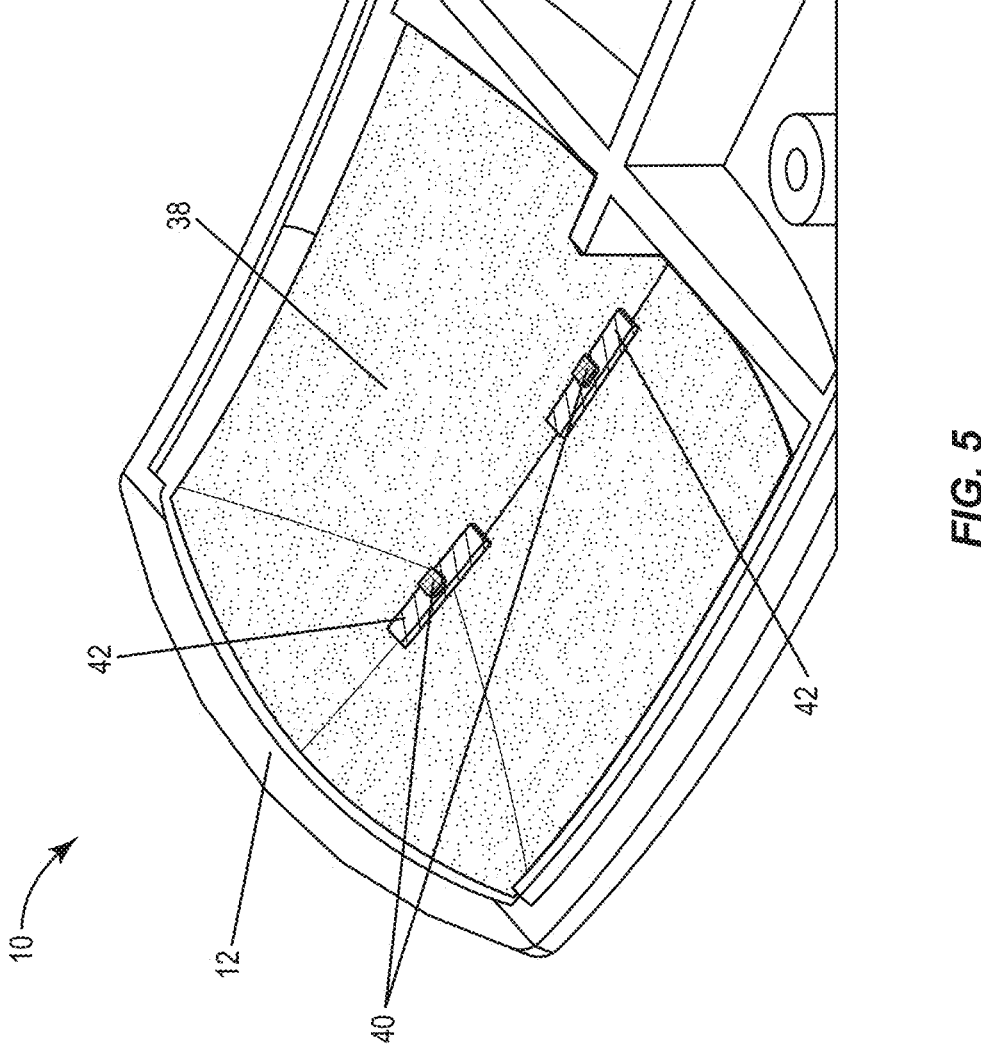
FIGS. 5-11B illustrate exemplary implementations of the scrolling input device with one or more force sensors according to some embodiments.

For the purpose of the FIG. 5 illustration, besides the touch-surface 12, the scrolling input device 10 further includes a capacitive touch film 38, two force sensors 40 with two suspended circuit boards 42. In different applications, the scrolling input device 10 includes only one force sensor 40 with one suspended circuit board 42 or more force sensors 40 with corresponding suspended circuit boards 42 (each force sensor 40 may have the same features as the force sensor 20 as illustrated in FIGS. 3A-3C, and each suspended circuit board 42 has the same features as the suspended circuit board 24 as described above). Herein, the capacitive touch film 38 is formed underneath the underside of the touch-surface 12 and covers an active area of the touch-surface 12. Each force sensor 40 is confined within the active area and connected to and suspended from the touch-surface 12 via a corresponding suspended circuit board 42. In some applications, each force sensor 40 is connected to and suspended from the capacitive touch film 38 via the corresponding suspended circuit board 42, such that the capacitive touch film 38 is vertically between the touch-surface 12 and the suspended circuit boards 42. In some applications, the suspended circuit boards 42 are portions of the capacitive touch film 38. The active area of the touch-surface 12, herein and hereafter, refers to a portion of the touch-surface 12, which a user's finger typically touches to perform a scrolling operation. In this case the force sensors 40 are located along a centerline of the active area of the touch-surface 12. In different applications, the force sensors 40 may be placed at different locations of the active area of the touch-surface 12.

The capacitive touch film 38 may be an FPC board or a PCB and is configured to determine touch locations of a scroll gesture on the touch-surface 12 (i.e., locations where the force is applied). Note that the touch locations of the scroll gesture are not directly provided by the capacitive touch film 38 but are estimated based on an output of the capacitive touch film 38. When the capacitive touch film 38 senses a user's finger touching a specific location of the upside of the touch-surface 12, the output of the capacitive touch film 38 is provided to a microcontroller of the scrolling input device 10 (not shown in FIG. 5, see a microcontroller 54 in FIG. 7) for location calculations. Once the touch locations of the scroll gesture are estimated, a physical displacement of the scroll gesture can also be calculated.

On the other hand, each of the force sensors 40 is configured to detect the force applied to the touch-surface 12 by sensing the strains in the touch-surface 12 (e.g., through the capacitive touch film 38 and/or the corresponding suspended circuit board 42). Once the touch locations of the scroll gesture are estimated, the amount of the force applied to the touch-surface 12 can be calculated by normalizing an output of each force sensor 40 based on a calibration table that contains force sensing sensitivity of each force sensor 40 as a function of the touch locations of the scroll gesture (as described above for the force sensor 20), and then combining the two normalized results. The touch locations of the scroll gesture and the amount of the force applied to the touch-surface 12 are constantly estimated by the microcontroller (not shown in FIG. 5, see a microcontroller 54 in FIG. 7) of the scrolling input device 10 at some fixed rate (e.g., 100 Hz) based on the output of each force sensor 40 and the output of the capacitive touch film 38. The output of each force sensor 40 may be transmitted to the microcontroller of the scrolling input device 10 through the corresponding suspended circuit board 42, the capacitive touch film 38, and/or other wires (not shown). The microcontroller is further configured to map estimated touch location changes (i.e., physical movement of a finger) with the calculated amount of force applied to a digital movement, which is typically stored in a memory component (not shown in FIG. 5, see a memory component 56 in FIG. 7) of the scrolling input device 10. Further, the microcontroller of the scrolling input device 10 will send instructions about the digital movement to a connected computer/processor via communication interface circuitry (not shown) of the scrolling input device 10.

For a non-limiting comparison example, in a first operation, where:

the estimated touch location for each force sensor 40 changes from x=1 mm to x=3 mm; and the output of each force sensor 40 changes from 5000 to 7500 ADC counts; and in a second operation, where:

the estimated touch location for each force sensor 40 still changes from x=1 mm to x=3 mm; and the output of each force sensor 40 changes from 20000 to 30000 ADC counts.

For both operations, where:

the force sensing sensitivity of each force sensor 40 is 100 counts per gram at x=1 mm and 150 counts per gram at x=3 mm; and a relationship between the amount of the force applied to the scrolling input device 10 and the scrolling speed multiplier of the scrolling input device 10 is a decreasing-power function as shown in FIG. 2.

In the first operation scenario, the finger has moved 2 mm, while the amount of the force applied to the scrolling input device 10 has remained at a constant 50 g [(5000 counts/(100 counts/g)=50 g=7500 counts/(150 counts/g)]. In the second operation scenario, the finger has moved 2 mm, while the amount of the force applied to the scrolling input device 10 has remained at a constant 200 g [(20000 counts/(100 counts/g)=200 g=30000 counts/(150 counts/g)]. As the decreasing-power function shown in FIG. 2, the 50 g of the force applied to the scrolling input device 10 corresponds to a ~2.3× scrolling speed multiplier, while the 200 g of the force applied to the scrolling input device 10 corresponds to a ~1× scrolling speed multiplier, which means the 2 mm physical displacement at 50 g would provide 2.3 times the amount of digital scrolling compared to the 2 mm physical displacement at 200 g. Alternatively, the 2 mm physical displacement at 50 g of the force applied would provide a same amount of digital scrolling as a 4.6 mm physical displacement at 200 g of the force applied. Therefore, by changing the amount of the force applied to the touch-surface 12 of the scrolling input device 10, the scrolling input device 10 is capable of providing different ranges of digital scrolling with the same physical displacement of the user's finger. Note that the force sensing sensitivity of each force sensor 40 and the scrolling sensitivity of the scrolling input device 10 are totally different sensitivities. The force sensing sensitivity of each force sensor 40 is a function of the touch locations of the scroll gesture (e.g., the touch locations of the user's finger), while the scrolling sensitivity of the scrolling input device 10 is a function of the amount of the force applied to the scrolling input device 10.

Figure 6:
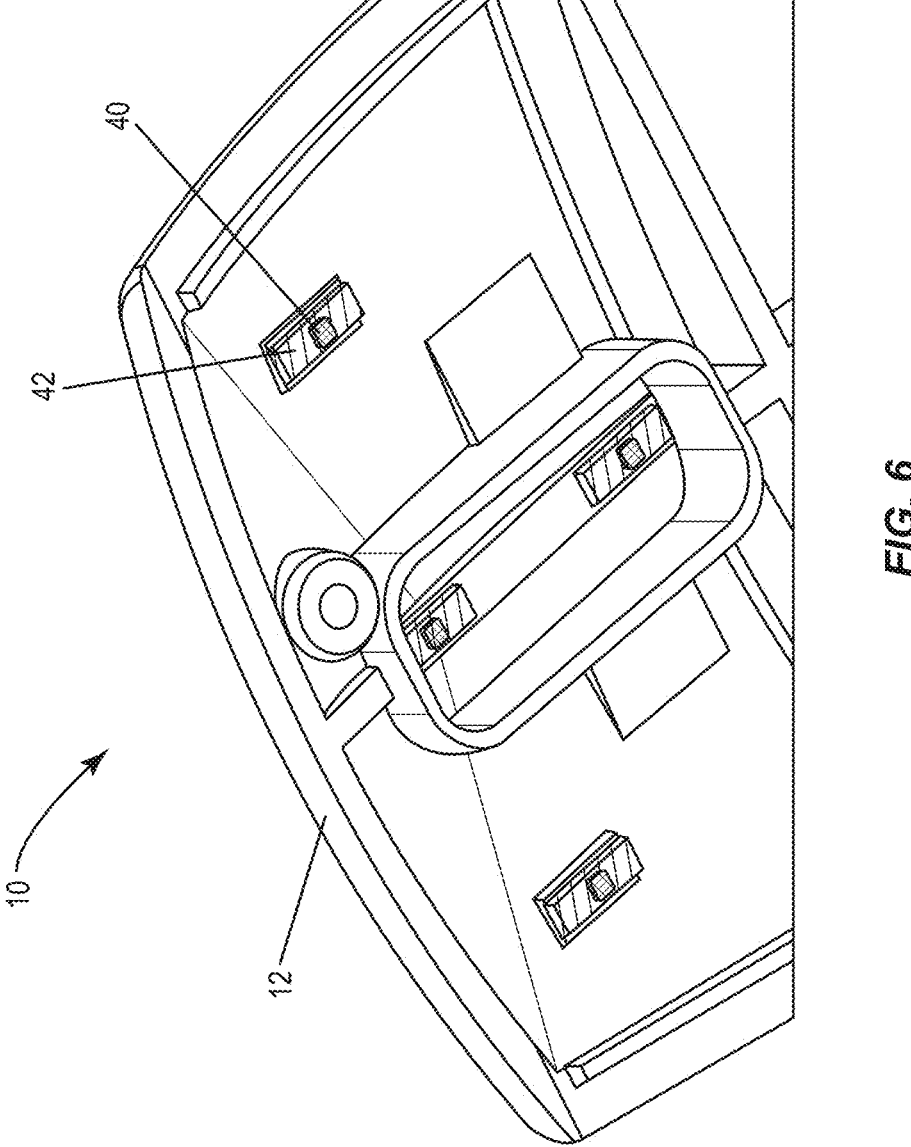

In some applications, the force sensors 40 are not only configured to detect the force applied to the touch-surface 12 of the scrolling input device 10 but are also configured to detect the touch locations of the scroll gesture. FIG. 6 shows that the scrolling input device 10 includes multiple force sensors 40, each of which is connected to and suspended from the underside of the touch-surface 12 via a corresponding suspended circuit board 42 without the capacitive touch film 38 (for clarity, only one force sensor 40 and one circuit board 42 are labeled with reference numbers). The multiple force sensors 40 are spread out across and around the active area. For the purpose of this illustration, the scrolling input device 10 includes four force sensors 40 with a T-shape layout within the active area of the touch-surface 12. In particular, two force sensors 40 are placed along the centerline of the active area of the touch-surface 12, and the other two force sensors 40 are placed on opposite sides of the centerline. In different applications, the scrolling input device 10 may include more force sensors 40 with a different layout.

Herein, the output of each force sensor 40 may be transmitted to the microcontroller (not shown in FIG. 6, see a microcontroller 54 in FIG. 7) of the scrolling input device 10 through the corresponding suspended circuit board 42 and other wires (not shown). Each force sensor 40 contribution to a total amount of output of all force sensors 40 will vary with the touch location, thereby creating a unique contribution profile for each touch location. Building a mapping between these contribution profiles and the touch locations of the scroll gesture (e.g., stored in a memory component of the scrolling input device 10) allows the scrolling input device 10 to estimate the touch locations of the scroll gesture without the use of any other sensing technology. Once the touch locations of the scroll gesture are estimated, calculation of the amount of the force applied to the scrolling input device 10 based on the output of each force sensor 40 proceeds as described above. Herein, the touch locations of the scroll gesture and the amount of the force applied to the scrolling input device 10 are still estimated/calculated by the microcontroller (not shown in FIG. 6, see a microcontroller 54 in FIG. 7) of the scrolling input device 10 at some fixed rate (e.g., 100 Hz) based on the outputs of the force sensors 40. The microcontroller is further configured to map estimated touch location changes (i.e., physical movement of a finger) with the calculated amount of the force applied to the scrolling input device 10 to a digital scrolling, and send instructions about the digital scrolling to a connected computer/processor via interface circuitry (not shown) of the scrolling input device 10.

Figure 7:
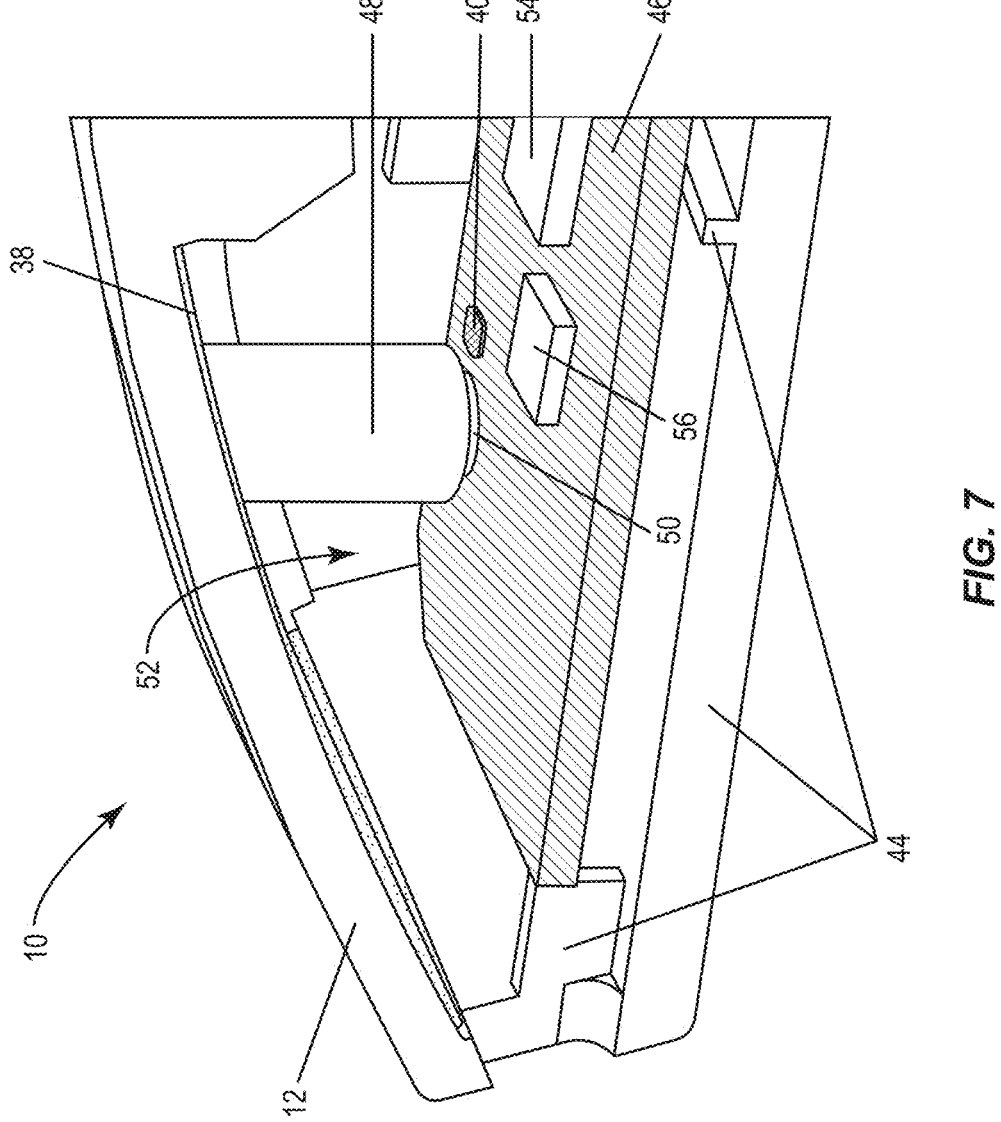

Using force sensing allows the touch-surface 12 to be made of materials, such as metals, that would be otherwise incompatible with other technologies like capacitive or optical. Suspending the force sensors 40 (i.e., attached to the underside of the touch-surface 12) preserves real estate on a main board (e.g., a main board 46 as illustrated in FIG. 7), allowing for a simpler geometry on the touch-surface, and loosens the tolerance requirements across the entire assembly.

In some embodiments, the force sensor 40 is not connected to or suspended from the underside of the touch-surface 12. As illustrated in FIG. 7, the scrolling input device 10 includes the touch-surface 12, the capacitive touch film 38, one force sensor 40, a support structure 44, a main board 46, and a connecting structure 48 with a rubber gasket 50. Herein, the capacitive touch film 38 formed underneath the underside of the touch-surface 12 is still configured to measure the touch location as described above. The support structure 44 is connected to the underside of the touch-surface 12 and configured to provide support to the main board 46, which is separate from the touch-surface 12. The main board 46 may be a FPC board or a PCB, which accommodates electronic components of the scrolling input device 10, such as a microcontroller 54 and a memory component 56. The touch-surface 12, the support structure 44, and the main board 46 form a cavity 52 within the scrolling input device 10. The connecting structure 48 extends from the underside of the touch-surface 12 towards the main board 46, where the connecting structure 48 may be integrated with the touch-surface 12 as a single piece, and the rubber gasket 50 is in contact with the main board 46. Typically, the connecting structure 48 is formed of a firm material, such that the force applied to the touch-surface 12 can be transferred to the main board 46 through the connecting structure 48.

The force sensor 40 is attached to a top surface of the main board 46, adjacent to the connecting structure 48, faces the underside of the touch-surface 12, and resides in the cavity 52. The force sensor 40 is configured to detect the force applied to the touch-surface 12 by sensing the strains in the main board 46 (i.e., the strains in the main board 46 are caused by the strains in the touch-surface 12, similar to the operation of the force sensor 20 illustrated in FIG. 4). In addition, the microcontroller 54 and the memory component 56 are also attached to the top surface of the main board 46, face the underside of the touch-surface 12, and reside in the cavity 52.

The output of the force sensor 40 may be transmitted to the microcontroller 54 through metal traces (not shown) within the main board 46. The touch locations of the scroll gesture and the amount of the force applied to the scrolling input device 10 are still estimated/calculated by the microcontroller 54 based on the output of the capacitive touch film 38 and the output of the force sensor 40, respectively. Algorithms used for the calculation of the amount of the force applied to the scrolling input device 10, algorithms used for estimating the touch locations of the scroll gesture, the calculated amount of the force applied to the scrolling input device 10, and the estimated touch locations of the scroll gesture may be stored in the memory component 56. The microcontroller 54 is further configured to map estimated touch location changes (i.e., physical movement of a finger) with the calculated amount of the force applied to the scrolling input device 10 to a digital scrolling, and send instructions about the digital scrolling to a connected computer/processor via interface circuitry (not shown) of the scrolling input device 10.

Figure 8:
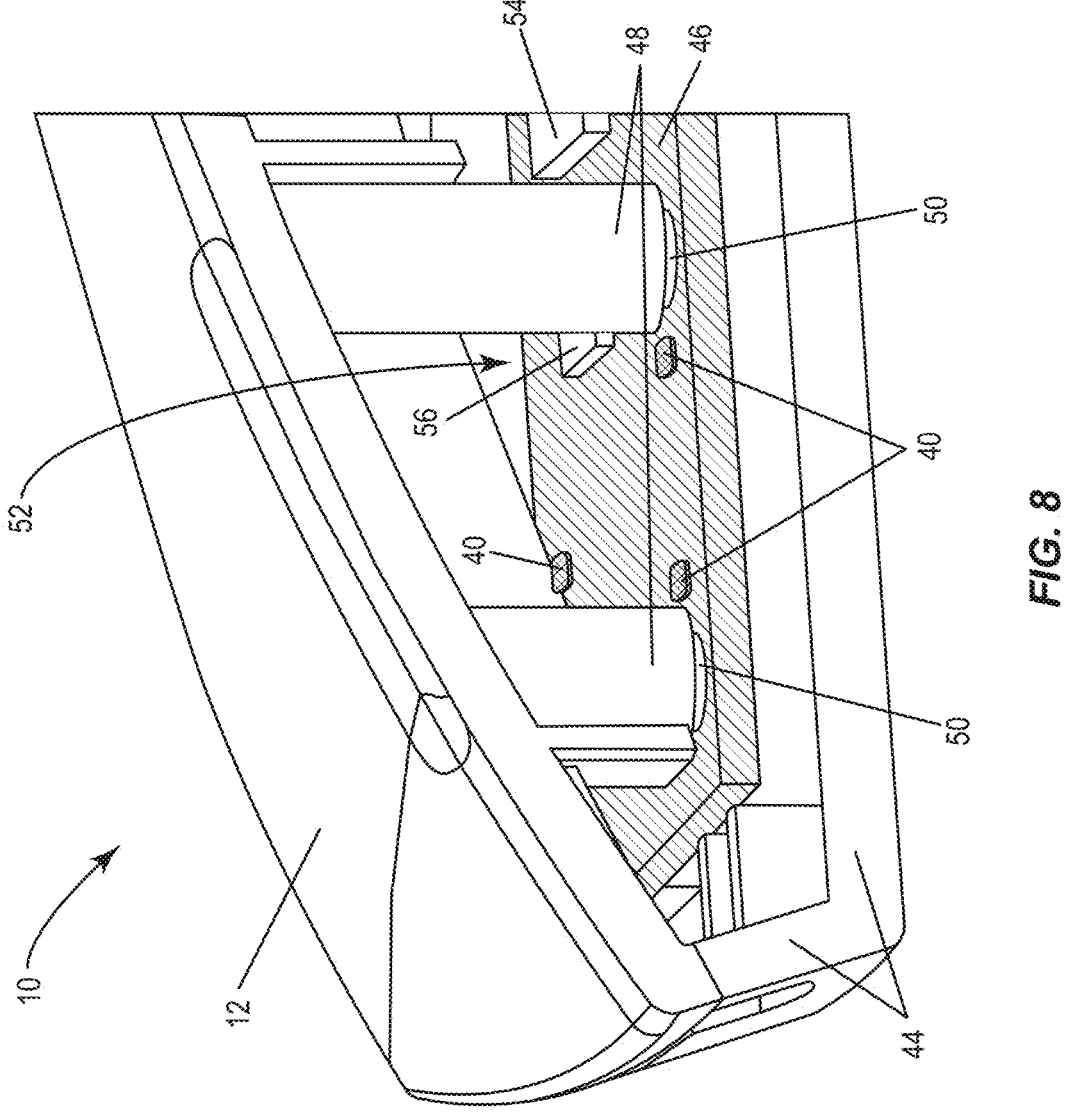

In different applications, there might be multiple force sensors 40 attached to the main board 46, which are configured to not only detect the force applied to the scrolling input device 10, but also configured to detect the touch locations of the scroll gesture. FIG. 8 shows that the scrolling input device 10 includes the touch-surface 12, multiple force sensors 40, the support structure 44, the main board 46, multiple connecting structures 48 with rubber gaskets 50, the microcontroller 54, and the memory component 56. The connecting structures 48 may be spread out across and underneath the active area. Each connecting structure 48 extends from the underside of the touch-surface 12 towards the main board 46, where each connecting structure 48 may be integrated with the touch-surface 12, and each rubber gasket 50 is contact with the main board 46. Each force sensor 40 is attached to the main board 46, adjacent to a corresponding connecting structure 48, faces the underside of the touch-surface 12, and resides in the cavity 52.

Herein, the output of each force sensor 40 may be transmitted to the microcontroller 54 through metal traces (not shown) within the main board 46. Each force sensor 40 contribution to a total amount of output of all force sensors 40 will vary with the touch location, thereby creating a unique contribution profile for each touch location. Building a mapping between these contribution profiles and the touch locations of the scroll gesture allows the scrolling input device 10 to estimate the touch locations of the scroll gesture without the use of any other sensing technology. Once the touch locations of the scroll gesture are estimated, calculation of the amount of the force applied to the scrolling input device 10 based on the output of each force sensor 40 proceeds as described above. Herein, the touch locations of the scroll gesture and the amount of the force applied to the scrolling input device 10 are still estimated/calculated by the microcontroller 54 based on the outputs of the force sensors 40. Algorithms used for the calculation of the amount of the force applied to the scrolling input device 10, algorithms used for estimating the touch locations of the scroll gesture, the calculated amount of the force applied to the scrolling input device 10, and the estimated touch locations of the scroll gesture may be stored in the memory component 56. The microcontroller 54 is further configured to map estimated touch location changes (i.e., physical movement of a finger) with the calculated amount of force applied to a digital scrolling, and send instructions about the digital scrolling to a connected computer/processor via interface circuitry (not shown) of the scrolling input device 10.

Figure 9:
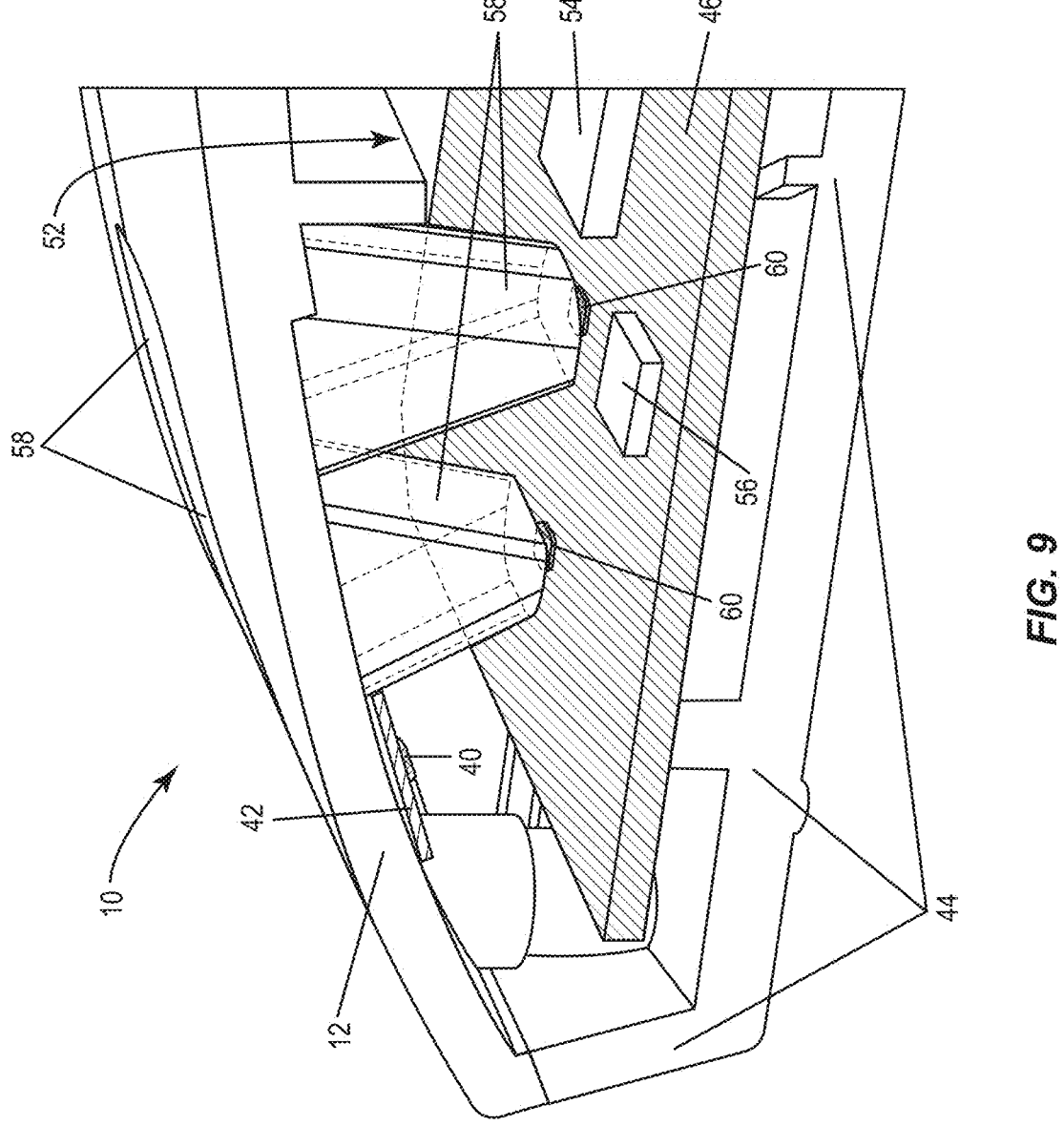

In some embodiments, the scrolling input device 10 utilizes optical technologies to measure the touch locations of the scroll gesture. As illustrated in FIG. 9, the scrolling input device 10 includes the touch-surface 12, one force sensor 40 with one suspended circuit board 42, the support structure 44, the main board 46, the microcontroller 54, the memory component 56, and two optical light guides 58 with optical sensors 60. In different applications, the scrolling input device 10 may include more force sensors 40 with corresponding suspended circuit boards 42, and one or more optical light guides 58 with corresponding optical sensors 60.

Herein, one end of each optical light guide 58 extends through the touch-surface 12 to allow light to pass through the touch-surface into the cavity 52 of the scrolling input device 10. Another end of each optical light guide 58 may be in contact with the main board 46 to secure the light passing along the optical light guide 58. Each optical sensor 60 is placed on the main board 46, faces the underside of the touch-surface 12, and is confined within a corresponding optical light guide 58. The output of each optical sensor 60 may be transmitted to the microcontroller 54 through metal traces (not shown) within the main board 46. The touch locations of the scroll gesture are estimated by an interpolation between the outputs of the two optical sensors 60. The force sensor 40 is connected to and suspended from the underside of the touch-surface 12 via the suspended circuit board 42. The output of the force sensor 40 may be transmitted to the microcontroller 54 through the suspended circuit board 42 and other wires (not shown). Once the touch locations of the scroll gesture are estimated, calculation of the amount of the force applied to the scrolling input device 10 based on the output of the force sensor 40 proceeds as described above. The touch locations of the scroll gesture and the amount of the force applied to the scrolling input device 10 are still estimated/calculated by the microcontroller 54, based on the outputs of the optical sensors 60 and the output of the force sensor 40, respectively. Algorithms used for the calculation of the amount of the force applied to the scrolling input device 10, and algorithms used for estimating the touch locations of the scroll gesture, the calculated amount of the force applied to the scrolling input device 10, and the estimated touch locations of the scroll gesture may be stored in the memory component 56. The microcontroller 54 is further configured to map estimated touch location changes (i.e., physical movement of a finger) with the calculated amount of the force applied to the scrolling input device 10 to a digital scrolling, and send instructions about the digital scrolling to a connected computer/processor via interface circuitry (not shown) of the scrolling input device 10.

Figure 10:
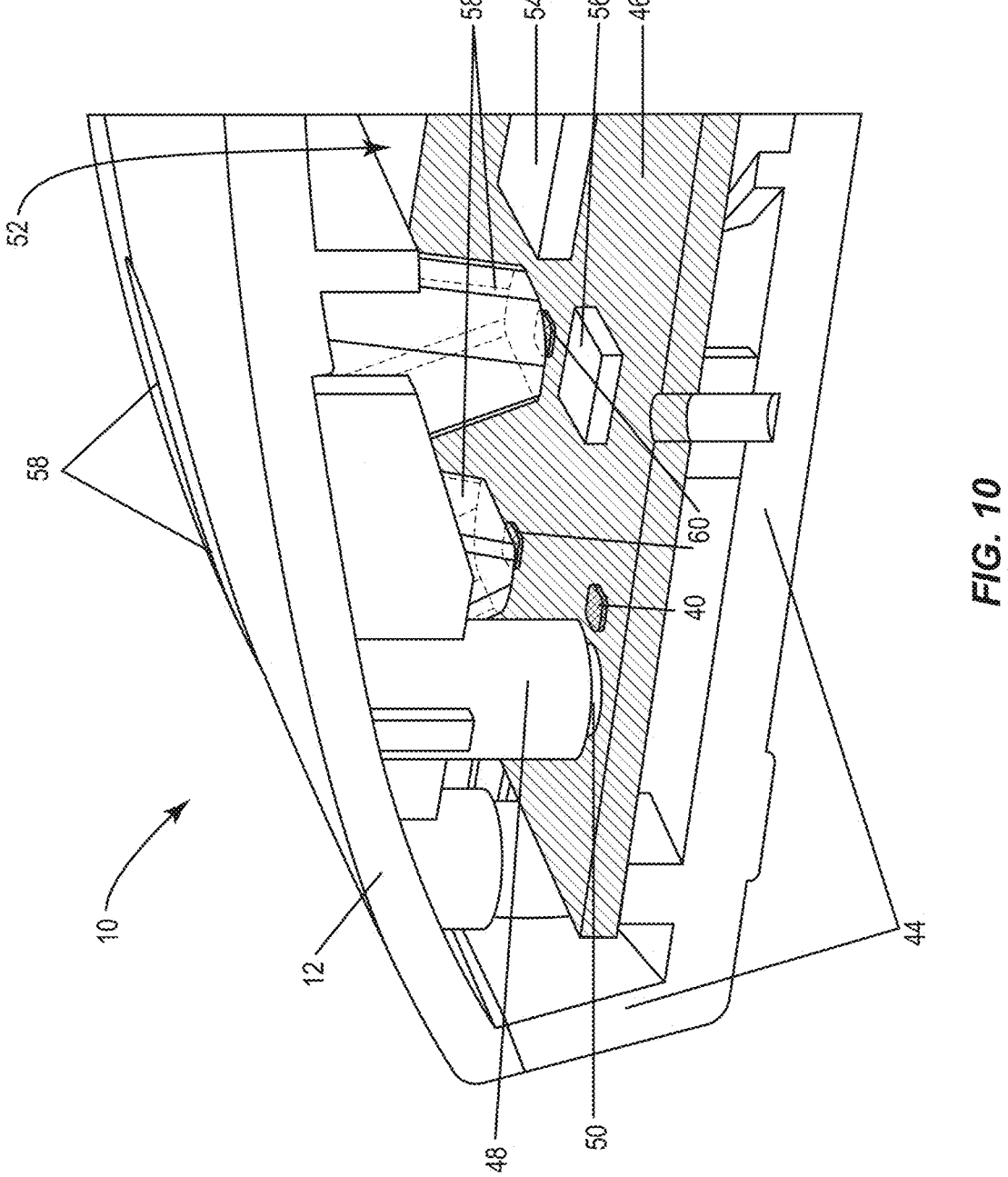

In some embodiments, the scrolling input device 10 combines the optical light guides 58 with the force sensors 40 attached to the main board 46, as illustrated in FIG. 10. The scrolling input device 10 includes the touch-surface 12, two force sensors 40 (one of the two force sensors 40 is blocked, and only one force sensor 40 is shown), the support structure 44, the main board 46, two connecting structures 48 with two rubber gaskets 50 (one of the connecting structures 48 and one of the two rubber gaskets 50 are blocked, only one connecting structure 48 and one rubber gasket 50 are shown), the microcontroller 54, the memory component 56, and two optical light guides 58 with two optical sensors 60. The two the optical light guides 58 are located along the centerline of the active area of the touch-surface 12 (extending through the touch-surface 12), the two connecting structures 48 are located at opposite sides of the optical light guides 58 (only one connecting structure and one rubber gasket are shown), and each force sensor 40 is located adjacent to a corresponding connecting structure 48. In different applications, the scrolling input device 10 may include fewer or more force sensors 40, fewer or more connecting structures 48, and/or fewer or more optical light guides 58 with corresponding optical sensors 60. The layout of the connecting structures 48 and the optical light guides 58 may be different. In addition, there might be more than one force sensor 40 placed next to the corresponding connecting structure 48.

Herein, the touch locations of the scroll gesture are estimated by the interpolation between the outputs of the optical sensors 60 confined within corresponding optical light guides 58, respectively, while the calculation of the amount of the force applied to the scrolling input device 10 is based on the output of the force sensor 40 by sensing the strains in the main board 46 (i.e., the strains in the main board 46 are caused by the strains in the touch-surface 12, similar to the operation of the force sensor 20 illustrated in FIG. 4). The touch locations of the scroll gesture and the amount of the force applied to the scrolling input device 10 are estimated/calculated by the microcontroller 54 based on the outputs of the optical sensors 60 and the outputs of the force sensors 40, respectively. Algorithms used for the calculation of the amount of the force applied to the scrolling input device 10, and algorithms used for estimating the touch locations of the scroll gesture, the calculated amount of the force applied to the scrolling input device 10, and the estimated touch locations of the scroll gesture may be stored in the memory component 56. The microcontroller 54 is further configured to map estimated touch location changes (i.e., physical movement of a finger) with the calculated amount of the force applied to the scrolling input device 10 to a digital scrolling, and send instructions about the digital scrolling to a connected computer/processor via interface circuitry (not shown) of the scrolling input device 10.

Figure 11A:
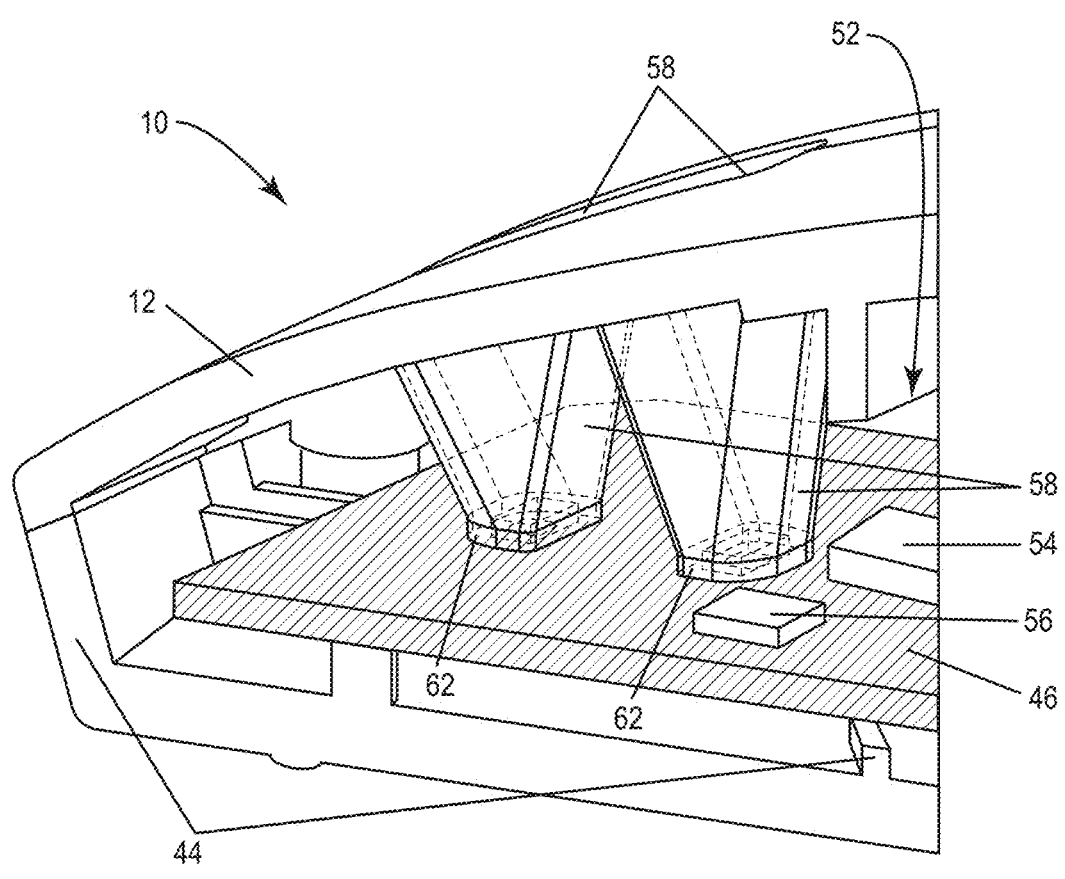
Figure 11B:
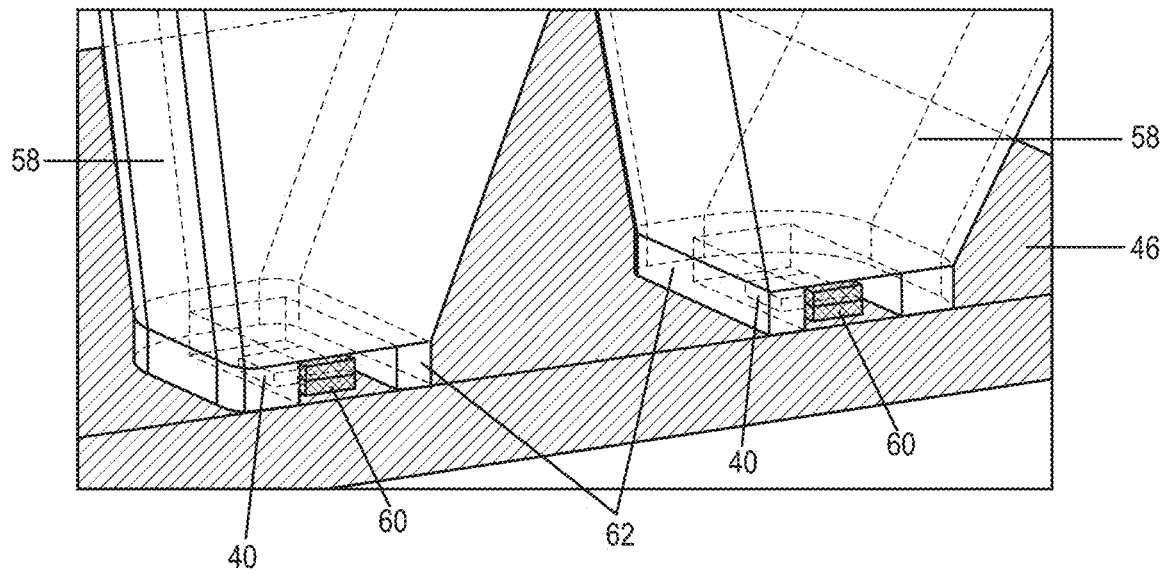

In some embodiments, the optical light guides 58 may further provide a force/strain transfer to the main board 46 (e.g., functioning as the connecting structures 48). As illustrated in FIGS. 11A and 11B, the scrolling input device 10 includes the touch-surface 12, two force sensors 40, the support structure 44, the main board 46, a microcontroller 54, a memory component 56, two optical light guides 58 with corresponding connecting bases 62, and two optical sensors 60. Herein, each connecting base 62 may be formed of rubber or plastic and has a ring shape. Each connecting base 62 is formed on the main board 46 and faces the underside of the touch-surface 12. The two optical light guides 58 are located along the centerline of the active area of the touch-surface 12. One end of each optical light guide 58 extends through the touch-surface 12 to allow light to pass through the touch-surface into the cavity 52, and another end of each optical light guide 58 is in contact with the corresponding connecting base 62. Each optical sensor 60 is placed on the main board 46, faces the underside of the touch-surface 12, and is confined within a corresponding connecting base 62. In addition, each force sensor 40 is placed on the main board 46, faces the underside of the touch-surface 12, and is confined within the corresponding connecting base 62.

The touch locations of the scroll gesture are estimated by the interpolation between the outputs of the optical sensors 60 confined within the connecting bases 62, respectively, as described above. A combination of one optical light guide 58 and one connecting base 62 further functions as a connecting structure (e.g., the connecting structure 48). The force applied to the touch-surface 12 can be transferred to the main board 46 through the combination of the optical light guide 58 and the connecting base 62. As such, each force sensor 40 within the corresponding connecting base 62 can detect the force applied to the touch-surface 12 by sensing the strains in the main board 46 (i.e., the strains in the main board 46 are caused by the strains in the touch-surface 12, similar to the operation of the force sensor 20 illustrated in FIG. 4). The touch locations of the scroll gesture and the amount of the force applied to the scrolling input device 10 are estimated/calculated by the microcontroller 54 based on the outputs of the optical sensors 60 and the outputs of the force sensors 40, respectively. Algorithms used for the calculation of the amount of the force applied to the scrolling input device 10, and algorithms used for estimating the touch locations of the scroll gesture, the calculated amount of the force applied to the scrolling input device 10, and the estimated touch locations of the scroll gesture may be stored in the memory component 56. The microcontroller 54 is further configured to map estimated touch location changes (i.e., physical movement of a finger) with the calculated amount of the force applied to the scrolling input device 10 to a digital scrolling, and send instructions about the digital scrolling to a connected computer/processor via interface circuitry (not shown) of the scrolling input device 10. In different applications, the scrolling input device 10 may include fewer or more optical light guides 58 with corresponding fewer or more connecting bases 62, fewer or more corresponding optical sensors 60, and fewer or more corresponding force sensors 40, in different layouts.

Figure 12:
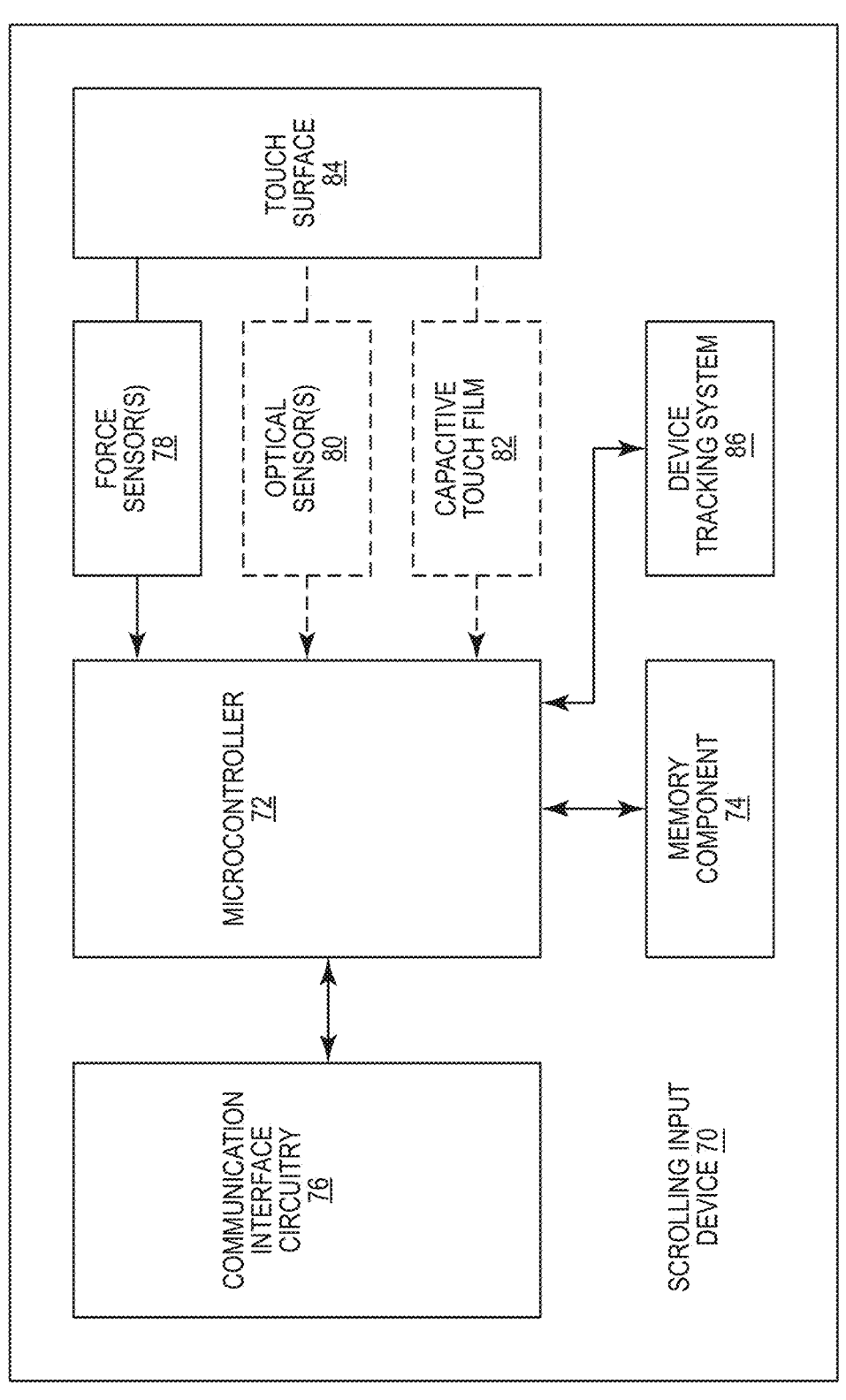
FIG. 12 illustrates a block diagram of an example scrolling input device that includes one or more force sensors.

FIG. 12 illustrates a block diagram of an example scrolling input device 70 that includes one or more force sensors. The scrolling input device 70 includes a microcontroller 72 (e.g., the microcontroller 54) electrically connected with a memory component 74 (e.g., the memory component 56) and communication interface circuitry 76. In certain embodiments, the communication interface circuitry 76 may include a transceiver and an optional antenna, and be configured to communicate with an external connected device (e.g., a computer, a projector). The scrolling input device 70 always includes one or more force sensors 78 (e.g., the force sensors 40 described above), and optionally includes one or more optical sensors 80 (e.g., the optical sensors 60 described above) or a capacitive touch film 82 (e.g., the capacitive touch film 38 described above). The force sensors 78 are configured to detect the force applied to a touch-surface 84 (e.g., the touch-surface 12) of the scrolling input device 70, and may further be configured to detect touch locations on the touch-surface 84 at which the force is applied. Either the optical sensors 80 or the capacitive touch film 82 might be configured to detect the touch locations on the touch-surface 84.

When the scrolling input device 70 only includes the force sensors 78, the microcontroller 72 is configured to receive outputs from the force sensors 78 and calculate the amount of the force applied to the touch surface 84 and the touch locations of the scroll gesture based on the outputs of the force sensors 78. Furthermore, the microcontroller 72 is configured to map estimated touch location changes (i.e., physical movement of a finger) with the calculated amount of the force applied to the touch surface 84 to a digital movement, and send instructions about the digital movement to a connected computer/processor via the communication interface circuitry 76. Algorithms used for the calculation of the amount of the force applied to the touch surface 84, and algorithms used for estimating the touch locations of the scroll gesture, the calculated amount of the force applied to the touch surface 84, and the estimated touch locations of the scroll gesture may be stored in the memory component 74.

Alternatively, when the scrolling input device 70 includes both the force sensors 78 and the optical sensors 80, the microcontroller 72 is configured to receive the outputs from the force sensors 78 and outputs from the optical sensors 80. The microcontroller 72 is configured to calculate the amount of the force applied to the touch surface 84 based on the outputs of force sensors 78 and estimate the touch locations of the scroll gesture based on the outputs from the optical sensors 80. When the scrolling input device 70 includes both the force sensors 78 and the capacitive touch film 82, the microcontroller 72 is configured to receive the outputs from the force sensors 78 and outputs from the capacitive touch film 82. The microcontroller 72 is config- ured to calculate the amount of the force applied to the touch surface 84 based on the outputs of the force sensors 78 and estimate the touch locations of the scroll gesture based on the outputs from the capacitive touch film 82. Other opera- tions of the microcontroller 72, the memory component 74, and the communication interface circuitry 76 are performed similarly as described above. In some applications, the scrolling input device 70 (e.g., a computer mouse) may also include a device tracking system 86 connected to the micro- controller 72. Note that the device tracking system 86 tracks different movements compared to the force sensors 78, the optical sensors 80, and the capacitive touch film 82. The force sensors 78, the optical sensors 80, and the capacitive touch film 82 are configured to track the physical displace- ment of and the force applied by a finger on the touch- surface 84, while the device tracking system 86 is configured to track a position change of the entire scrolling input device 70 relative to an underlying surface.

Figure 13:
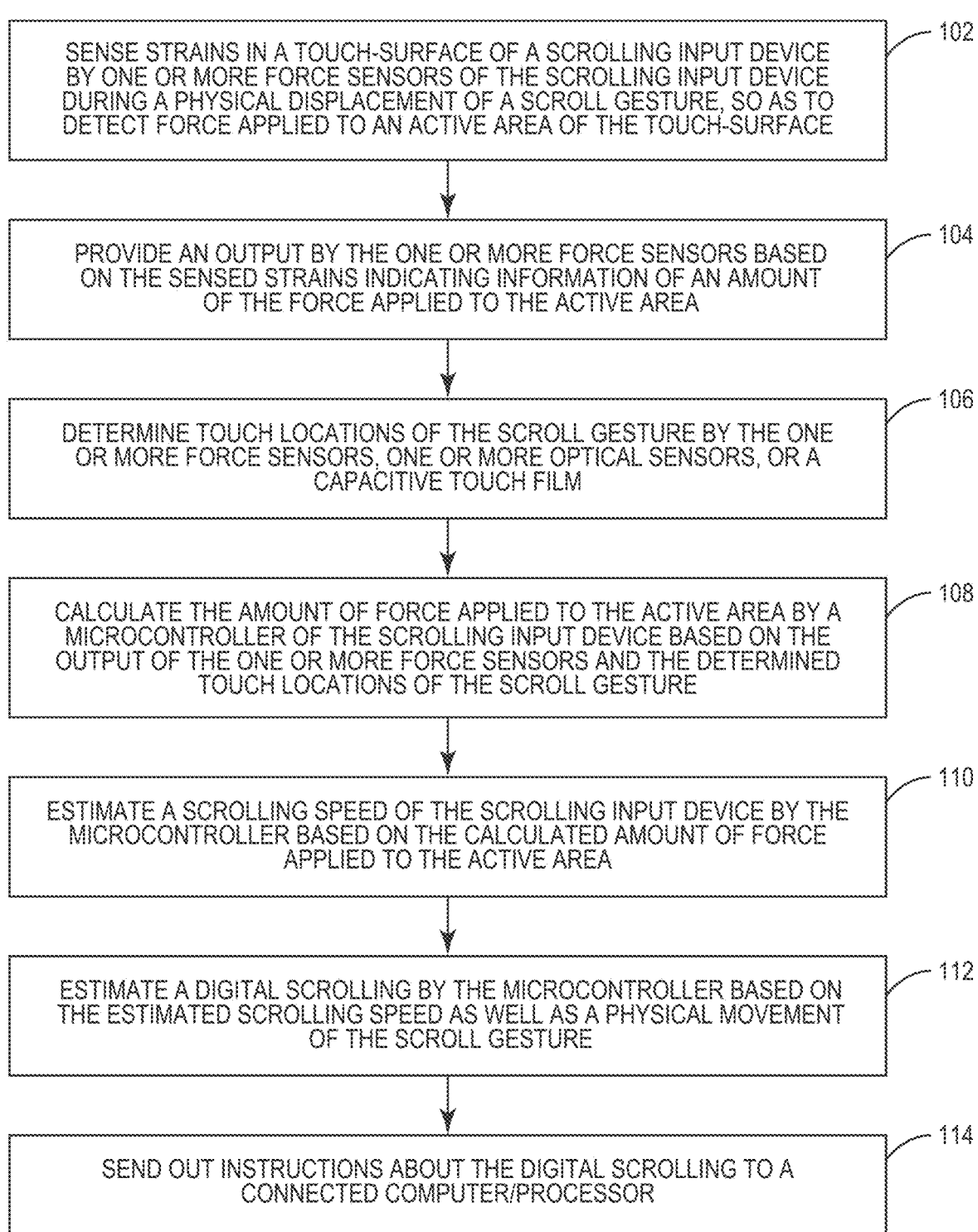
FIG. 13 illustrates a flowchart of a method of operations of a scrolling input device for mapping a physical movement of a scroll gesture into a digital scrolling according to some embodiments of the present disclosure.

FIG. 13 illustrates a flowchart of operations of a scrolling input device (e.g., the scrolling input device 10/70) for mapping a physical movement of a scroll gesture into a digital scrolling according to some embodiments of the present disclosure. Although the process steps are illustrated in a series, the process steps are not necessarily order dependent. Some steps may be done in a different order than that presented. Further, processes within the scope of this disclosure may include fewer or more steps than those illustrated in FIG. 13.

Initially, strains in a touch-surface (e.g., the touch-surface 12/84) of the scrolling input device are sensed by one or more force sensors (e.g., the force sensors 40/78) within the scrolling input device (step 102). Herein, the strains in the touch surface are caused by force applied to an active area of the touch surface. Based on the sensed strains, the one or more force sensors are configured to provide an output that indicates information of an amount of the force applied to the active area of the touch surface (step 104). Within the scrolling input device, the one or more force sensors, one or more optical sensors (e.g., the optical sensors 60/80), or a capacitive touch film (e.g., the capacitive touch film 38/82) may be utilized to determine touch locations of the scroll gesture (step 106).

Next, the amount of the force applied to the active area is calculated by a microcontroller (e.g., the microcontroller 54/72) of the scrolling input device based on the output of the one or more force sensors and the determined touch locations of the scroll gesture (step 108). Note that the amount of the force applied to the active area is not directly provided by the one or more force sensors but is calculated by normalizing the output of the one or more force sensors based on a calibration table that contains force sensing sensitivity as a function of the touch locations of the scroll gesture. Algorithms used for the calculation of the amount of the force applied and the touch locations of the scroll gesture, and the determined touch locations of the scroll gesture and the calculated amount of the force applied to the active area may be stored in a memory component (e.g., of the memory component 56/74).

Once the amount of the force applied to the active area is calculated/determined, a scrolling speed of the scrolling input device is estimated by the microcontroller of the scrolling input device based on the amount of the force applied to the active area (step 110). A relationship between the amount of the force applied to the scrolling input device and the scrolling speed multiplier of the scrolling input device may take on any arbitrary form and may be pre- determined. Algorithms used to estimate the scrolling speed and the estimated scrolling speed may also be stored in the memory component.

The microcontroller of the scrolling input device then estimates the digital scrolling based on both the physical movement and the estimated scrolling speed (step 112). Mapping information between the physical movement with the estimated scrolling speed and the digital scrolling may be stored in the memory component. Lastly, the microcon- troller of the scrolling input device sends out instructions about the digital scrolling to a connected computer/proces- sor via a communication interface circuitry (e.g., the com- munication interface circuitry 76, step 114).

It is contemplated that any of the foregoing aspects, and/or various separate aspects and features as described herein, may be combined for additional advantage. Any of the various embodiments as disclosed herein may be com- bined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A scrolling input device that maps a physical movement of a scroll gesture into a digital scrolling comprising:
   a touch-surface with an active area where a force is applied;
   at least one force sensor formed under the active area of the touch-surface, wherein the at least one force sensor is configured to detect the force applied to the active area by sensing strains in the touch-surface during the physical displacement of the scroll gesture and config- ured to provide an output based on the sensed strains indicating information of an amount of the force applied to the active area;
   a microcontroller configured to calculate the amount of the force applied to the active area based on the output of the at least one force sensor and touch locations of the scroll gesture, configured to estimate a scrolling speed of the scrolling input device based on the calcu- lated amount of the force applied to the active area, and configured to estimate the digital scrolling based on both the physical movement and the estimated scrolling speed;
   a support structure connected to an underside of the touch-surface to provide a cavity within the scrolling input device; and
   a main board separated from the touch-surface and located within the cavity, wherein:
   the support structure is configured to provide mechani- cal support to the main board; and
   the microcontroller is located on the main board and within the cavity, and faces the underside of the touch-surface.

2. The scrolling input device of claim 1 wherein a relationship between the amount of the force applied to the active area and the scrolling speed of the scrolling input device is linear, power, or exponential.

3. The scrolling input device of claim 1 wherein a relationship between the amount of the force applied to the active area and the scrolling speed of the scrolling input device monotonically increases or monotonically decreases.

4. The scrolling input device of claim 1 further includes at least one suspended circuit board formed on the underside of the touch-surface, wherein:

the at least one force sensor is connected to and suspended from the underside of the touch-surface via the at least one suspended circuit board, confined in the active area, and located within the cavity; and the at least one suspended circuit board is configured to carry the output of the at least one force sensor.

5. The scrolling input device of claim 4 wherein the at least one suspended circuit board is a printed circuit board (PCB) or a flexible printed circuit (FPC) board.

6. The scrolling input device of claim 4 further includes a capacitive touch film, which is formed underneath the underside of the touch-surface and covers the active area of the touch-surface, wherein:

the capacitive touch film is configured to detect touch locations of the scroll gesture, and configured to provide an output indicating the touch locations of the scroll gesture; and the microcontroller is configured to estimate the physical displacement of the scroll gesture based on the output of the capacitive touch film.

7. The scrolling input device of claim 6 wherein:

the capacitive touch film is formed directly underneath the underside of the touch-surface; and the at least one suspended circuit board is formed directly underneath the capacitive touch film.

8. The scrolling input device of claim 6 wherein the at least one suspended circuit board is a portion of the capacitive touch film.

9. The scrolling input device of claim 8 wherein the capacitive touch film is an FPC board or a PCB.

10. The scrolling input device of claim 4 wherein:

the at least one force sensor comprises a plurality of force sensors, and the at least one suspended circuit board comprises a plurality of suspended circuit boards;

the plurality of force sensors is spread out across and around the active area;

each of the plurality of force sensors is connected to and suspended from the underside of the touch-surface via a corresponding one of the plurality of suspended circuit boards;

the plurality of force sensors is configured to detect both the force applied to the active area and touch locations of the scroll gesture, and configured to provide a plurality of outputs, respectively, indicating information of both the touch locations of the scroll gesture and the amount of the force applied to the active area; and the microcontroller is configured to further estimate the physical displacement of the scroll gesture based on the plurality of outputs of the plurality of force sensors.

11. The scrolling input device of claim 4 further comprising at least one optical light guide with at least one optical sensor, wherein:

one end of the at least one optical light guide extends through the touch-surface to allow light to pass through the touch-surface into the cavity, and another end of the at least one optical light guide is in contact with the main board to secure the light passing along the optical light guide;

the at least one optical sensor is placed on the main board, faces the underside of the touch-surface, and is confined within the at least one optical light guide;

the at least one optical sensor is configured to detect touch locations of the scroll gesture, and configured to provide an output indicating information of the touch locations of the scroll gesture; and the microcontroller is configured to estimate the physical displacement of the scroll gesture based on the output of the at least one optical sensor.

12. The scrolling input device of claim 1 further comprising at least one connecting structure, wherein:

the at least one connecting structure extends from the underside of the touch-surface towards the main board, and is configured to transfer the force applied to the touch-surface to the main board;

the at least one force sensor is attached to the main board, adjacent to the at least one connecting structure, faces the underside of the touch-surface, and resides within the cavity; and the at least one force sensor is configured to detect the force applied to the active area by sensing strains in the main board that are caused by the strains in the touch-surface.

13. The scrolling input device of claim 12 further includes a capacitive touch film, which is formed underneath the underside of the touch-surface and covers the active area of the touch-surface, wherein:

the capacitive touch film is configured to detect touch locations of the scroll gesture, and configured to provide an output indicating information of the touch locations of the scroll gesture; and the microcontroller is configured to estimate the physical displacement of the scroll gesture based on the output of the capacitive touch film.

14. The scrolling input device of claim 12 wherein:

the at least one force sensor comprises a plurality of force sensors;

the at least one connecting structure comprises a plurality of connecting structures, which are spread out across and underneath the active area;

each of the plurality of connecting structures extends from the underside of the touch-surface towards the main board, and is configured to transfer the force applied to the touch-surface to the main board;

each of the plurality of force sensors is attached to the main board, adjacent to a corresponding one of the plurality of connecting structures, faces the underside of the touch-surface, and resides within the cavity;

the plurality of force sensors is configured to detect both the force applied to the active area and touch locations of the scroll gesture, and configured to provide a plurality of outputs, respectively, indicating information of both the touch locations of the scroll gesture and the amount of the force applied to the active area; and the microcontroller is configured to further estimate the physical displacement of the scroll gesture based on the plurality of outputs of the plurality of force sensors.

15. The scrolling input device of claim 12 further comprising at least one optical light guide with at least one optical sensor, wherein:

one end of the at least one optical light guide extends through the touch-surface to allow light to pass through the touch-surface into the cavity, and another end of the at least one optical light guide is in contact with the main board to secure the light passing along the optical light guide;

the at least one optical sensor is placed on the main board, faces the underside of the touch-surface, and is confined within the at least one optical light guide;

the at least one optical sensor is configured to detect touch locations of the scroll gesture, and configured to provide an output indicating the touch locations of the scroll gesture; and the microcontroller is configured to estimate the physical displacement of the scroll gesture based on the output of the at least one optical sensor.

16. The scrolling input device of claim 12 wherein the at least one connecting structure is integrated with the touch-surface as a single piece and is connected to the main board via at least one rubber gasket.

17. The scrolling input device of claim 1 further comprising at least one connecting base and at least one optical light guide with at least one optical sensor, wherein:

the at least one connecting base is formed on the main board and faces the underside of the touch-surface;

one end of the at least one optical light guide extends through the touch-surface to allow light to pass through the touch-surface into the cavity, and another end of the at least one optical light guide is in contact with the at least one connecting base, wherein a combination of the at least one optical light guide and the at least one connecting base is configured to transfer the force applied to the touch-surface to the main board;

the at least one optical sensor is placed on the main board, faces the underside of the touch-surface, and is confined within the at least one connecting base, wherein the at least one optical sensor is configured to detect touch locations of the scroll gesture, and configured to provide an output indicating information of the touch locations of the scroll gesture;

the at least one force sensor is placed on the main board, faces the underside of the touch-surface, and is confined within the at least one connecting base, wherein the at least one force sensor is configured to detect the force applied to the touch-surface by sensing strains in the main board that are caused by the strains in the touch-surface; and the microcontroller is configured to estimate the physical displacement of the scroll gesture based on the output of the at least one optical sensor.

18. The scrolling input device of claim 17 wherein the at least one connecting base is formed of rubber or plastic and has a ring shape.

19. The scrolling input device of claim 1 further comprising a memory component, which is configured to store algorithms used for calculating the amount of the force applied to the active area based on the output of the at least one force sensor.

* * * * *